Sept. 13, 1949.    H. BLAIR    2,481,717
TILTING TRIPOD HEAD
Filed March 19, 1946
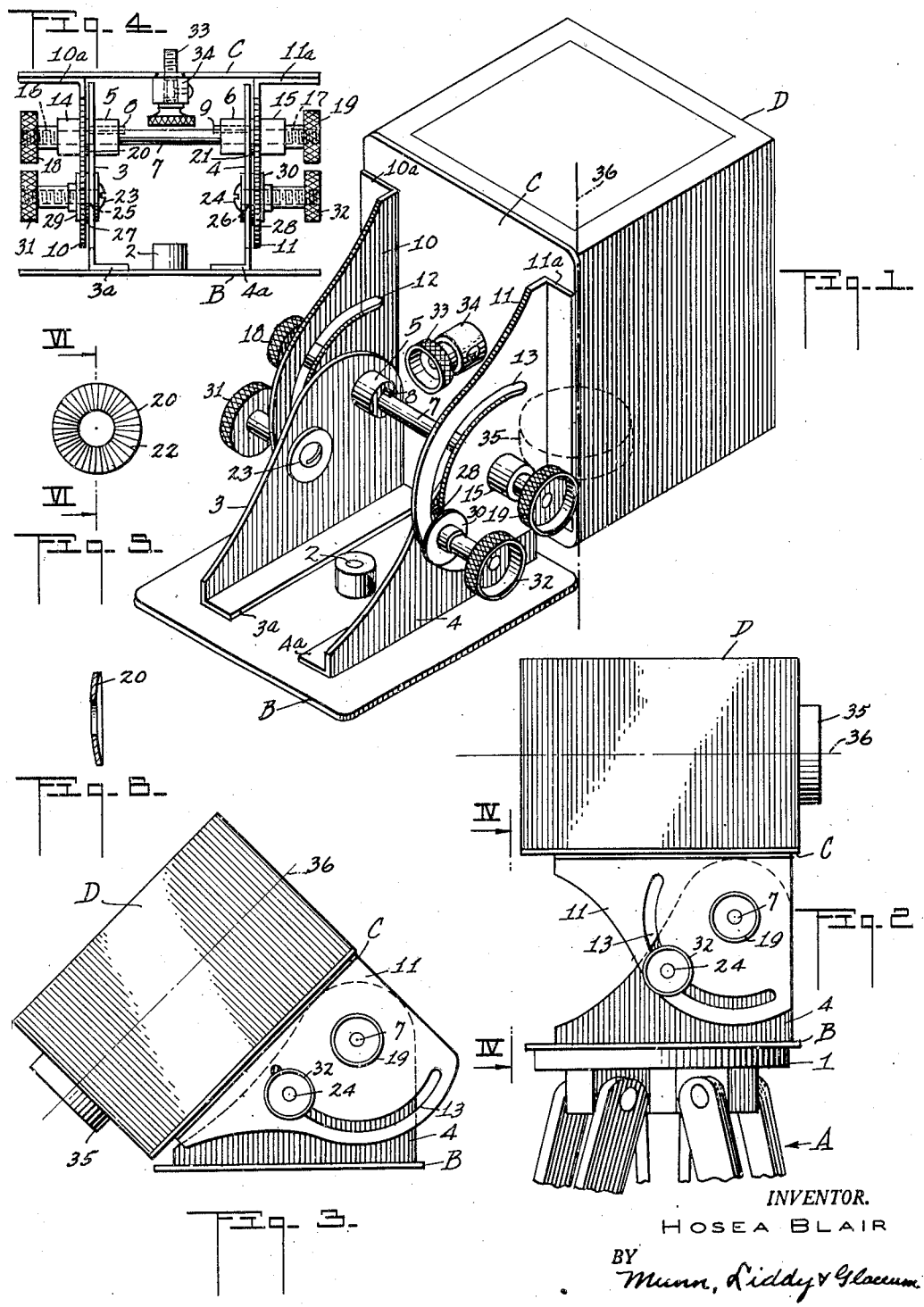
INVENTOR.
HOSEA BLAIR
BY Munn, Liddy & Glaccum
ATTORNEYS Patented Sept. 13, 1949

2,481,717

UNITED STATES PATENT OFFICE 2,481,717

TILTING TRIPOD HEAD

Hosea Blair, San Francisco, Calif.

Application March 19, 1946, Serial No. 655,482

2 Claims. (Cl. 248—183)

An object of my invention is to provide a tilting tripod head for a camera in which the camera may be swung from a position in which its lens axis lies in a perpendicular plane into a position where the lens axis is inclined at an angle of 45° with respect to the horizontal. The camera can therefore be swung through an arc of at least 135°. The camera is pivotally mounted on the base and is swingable through 360° about its pivot.

A further object of my invention is to provide a tilting tripod in which the camera base can be clamped in adjusted position for supporting the camera rigidly to the tripod at any desired angular position between the extreme limits of its movement. Novel means is provided for gripping the moving parts for holding them against accidental movement.

The invention is extremely simple in construction and can be manufactured at small cost, thus permitting the device to be sold at a cheaper price.

Other objects and advantages will appear in the following specification, and the novel features of the device will be particularly pointed out in the appended claims.

My invention is illustrated in the accompanying drawings forming a part of this application, in which:

Figure 1 is an isometric view of the device showing a camera operatively applied thereto;

Figure 2 is a side elevation of the device and illustrates it mounted upon a tripod;

Figure 3 is a view similar to Figure 2, and shows the camera base swung into a different angular position;

Figure 4 is an end elevation taken along the line IV—IV of Figure 2;

Figure 5 is a plan view of one of the serrated cup-shaped washers used with the device; and Figure 6 is a vertical section taken along the line VI—VI of Figure 5.

While I have shown only the preferred form of my invention, it should be understood that various changes or modifications may be made within the scope of the appended claims without departing from the spirit and scope of the invention.

In carrying out my invention, I make use of a tripod indicated generally at A in Figure 2. The tripod has a platform 1 on which the tripod base B of my device rests. Figure 1 shows a boss 2 with a threaded bore for removably receiving a screw that secures the tripod base B to the platform 1. The base may be rotated through a complete circle with respect to the platform and then secured rigidly thereto. The tripod base is most conveniently made of a rectangular plate as shown, this construction providing it with straight parallel front and rear edges at opposites of its pivot point 2.

The base B carries two wings 3 and 4 that extend upwardly from the top of the base as shown in Figure 1 each having a vertical edge rising above and substantially in alinement with the straight front edge of said base. The wings 3 and 4 may be cast as a unit with the base B or they may be provided with flanges 3a and 4a that are welded or otherwise secured to the base.

Referring to Figure 4, it will be seen that the wings 3 and 4 have integral bosses 5 and 6 that extend toward each other from the inner faces of the wings. The bosses receive a supporting shaft 7 that is keyed to both bosses at 8 and 9. The ends of the shaft 7 project beyond the outer surface of the wings 3 and 4 and rotatably support a camera base indicated generally at C.

It is best to describe the camera base C at this time and then to set forth how it is pivotally supported on the tripod base. The under surface of the camera base has downwardly extending and parallelly arranged wings 10 and 11 that receive the wings 3 and 4. The wings 10 and 11 may be cast integral with the camera base C, or may be separate parts and have flanges 10a and 11a that are welded or otherwise secured to the base. The wings 10 and 11 have arcuate slots 12 and 13 therein whose centers lie in the axis of the shaft 7. The wings 10 and 11 also carry bosses 14 and 15 that extend outwardly from the outer surface of the wings and rotatably receive the projecting ends of the shaft 7. The portions of the shaft ends extending beyond the bosses 14 and 15 are threaded at 16 and 17 and receive knurled nuts 18 and 19.

Between the wings 3 and 10, I dispose a washer 20 and between the wings 4 and 11 I dispose another washer 21, these washers being mounted on the shaft 7. One of the washers is shown on an enlarged scale in Figures 5 and 6 and it will be seen from Figure 6 that the washer is slightly dish-shaped and Figure 5 illustrates that the concave surface of the washer is provided with radially extending serrations 22. The washers 20 and 21 are mounted on the shaft 7 so that their serrated surfaces will abut the inner surface of the wings 10 and 11. It is possible to tighten the nuts 18 and 19 and cause the washers 20 and 21 to frictionally engage with the wings 10 and 11 for holding them against rotation with respect to the wings 3 and 4.

I provide additional clamping means in bolts 23 and 24 that extend through openings 25 and 26 in the wings 3 and 4 and also are slidably received in the arcuate slots 12 and 13. Washers 27 and 28 are similar to the washers 20 and 21 and are placed between the pairs of wings 3 and 10, and 4 and 11. The serrated surface of these washers 27 and 28 bear against the wings 10 and 11. Additional serrated washers 29 and 30 of the same type as the washers 20 are mounted on the bolts 23 and 24 and have their serrated surfaces bearing against the wings 10 and 11. Knurled nuts 31 and 32 with elongated shanks are threaded upon the bolts 23 and 24 and bear against the washers 29 and 30 to force them against the wings 10 and 11. A tightening of the nuts 31 and 32 will also move the washers 27 and 28 into gripping relation with the wings 10 and 11. The result is that the wings 10 and 11 will be clamped tightly to the wings 3 and 4 and can be held in adjusted position.

The camera indicated generally at D is secured to the camera base C by a screw 33. The screw 33 is received in a boss 34 that in turn is secured to the base C and the boss permits the screw to be rotated into a threaded opening, not shown, in the bottom of the camera for rigidly securing the camera to the base C.

From the foregoing description of the various parts of the device, the operation thereof may be readily understood.

In use the tripod base B is secured to the tripod A and then the camera D is secured to the camera supporting base C. Normally, the lens 35 of the camera points in the direction shown in Figures 1 and 2 with respect to the camera base C. It is possible to point the camera straight down as indicated in Figure 1, so that the lens axis 36 will lie in a vertical plane. It is also possible to swing the camera into a horizontal position or into a position where the camera axis 36 will extend downwardly at an angle of 45° as shown in Figure 3. It will be noted in Figure 3 that the camera has been swung through an arc of 180° about the axis of the boss 2 on the base C so that the lens 35 will be pointing in the opposite direction to that shown in Figures 1 and 2. The camera can be pointed in any direction desired within the limits of the swing afforded by the wings 10 and 11 and the horizontal supporting shaft 7.

The foregoing adjustments, it will be noted, are accomplished by reason of the position of shaft 7, as shown, above the base B and near the plane defined by the front vertical edges of the wings 4. This allows the camera supporting base C, in the position of adjustment shown in Fig. 1, to be rotated into engagement with the edges of the wings 4 so that the operator knows that the camera is in a true vertical position, the camera then pointing downwardly beyond the forward edge of the tripod base. When the base B is tilted in the extreme opposite position, shown in Fig. 3, the camera which is pivotally connected to its base by the screw 33 and is rotated thereon will project its lens axis beyond the rear edge of the base B.

I claim:

1. In a tilting tripod head, a horizontally rotatable tripod base having parallel front and rear edges, upstanding spaced vertical wings on the base, a camera carrying base, means thereon for pivotally securing a camera thereon, said base having spaced wings located in overlapping relation to the first-mentioned wings, a shaft pivotally connecting said two pairs of wings disposed above the tripod base and in a position to support the camera base in one position of adjustment vertically above and beyond the front edge of the tripod base and in another adjusted position at an acute angle to the rear edge of the base.

2. In a tilting camera tripod head, a horizontally rotatable tripod base having a straight forward edge removed from its point of rotation, a wing extending upwardly therefrom having a vertical forward edge adjacent said edge of the tripod base, a camera base having a wing overlapping the first-mentioned wing, a pivot connecting said wings at a point serving to allow the camera base in one position of adjustment to rotate into a vertical position against the forward edge of the first mentioned wing.

HOSEA BLAIR.

REFERENCES CITED

The following references are of record in the file of this patent:

UNITED STATES PATENTS

| Number | Name | Date |
|---|---|---|
| 277,650 | Wright | May 15, 1883 |
| 1,742,661 | McClintock | Jan. 7, 1930 |

FOREIGN PATENTS

| Number | Country | Date |
|---|---|---|
| 399,408 | Germany | July 22, 1924 |